3,374,209
THERMOSETTABLE COMPOSITIONS CONTAINING POLYANHYDRIDE AND MONO-OXIRANE COMPOUNDS AND PROCESS OF MAKING
Russell G. Hay, Gibsonia, Stanley M. Hazen, Cheswick, and William J. Heilman, Allison Park, Pa., assignors to Gulf Research & Development Company, Pittsburgh, Pa., a corporation of Delaware
No Drawing. Filed Dec. 22, 1964, Ser. No. 424,470
24 Claims. (Cl. 260—78.4)

This invention relates to new liquid compositions capable of being thermoset to solid, infusible resins. In particular, these compositions comprise a liquid solution of certain solid polyanhydrides in certain liquid mono-oxirane compounds.

There are many types of resinous compositions in the art. One of the most popular are the epoxy resin compositions prepared by the cross-linking of polyepoxide compounds with various cross-linking agents such as mono- and dianhydrides. It has been suggested in the art to prepare resinous compositions by the reaction of mono-epoxides and dianhydrides in the presence of alcoholic, phenolic or carboxylic acid groups. In these latter resinous compositions, the presence of the hydroxyl containing component was believed to be essential to the reaction. For example, in column 1 lines 33–34 of U.S. 2,934,513 to Darrell D. Hicks et al. issued Apr. 26, 1960, it is stated that a dibasic acid anhydride will not react with a monoepoxide, if pure. In British Patent 852,612 published Oct. 26, 1960, page 1, lines 66–67, it is stated that a dihydric alcohol must be present in the compositions of the invention which comprise in addition to the dihydric alcohol, a monoepoxide and dianhydride. It would be desirable to be able to prepare resinous compositions without the use of the alcohols, glycols, etc. which would have good flexural strength, acceptable heat distortion temperatures (HDT) and excellent solvent resistance properties. It has now been found that certain selected types of polyanhydrides will react with certain monoepoxides to form these desirable compositions at low temperatures and pressures. What has been found are curable liquid compositions which can be made into solid, infusible products which are tough and flexible, or hard and rigid as desired.

In accordance with the invention, a new composition capable of being thermoset to a solid, infusible resin having excellent solvent resistance properties comprises a liquid solution at room temperature of a mixture of a solid compound containing at least two succinic anhydride groups and less than three conjugated double bonds when one of the conjugated double bonds is between the carbon atoms alpha to the carbonyl groups in a succinic anhydride group and a liquid mono-oxirane compound containing as its only functional group a single oxirane oxygen atom.

In one embodiment of the invention, a new composition capable of being thermoset to a solid infusible resin having excellent solvent resistance properties comprises a liquid solution at room temperature of a mixture of a solid compound containing at least two succinic anhydride groups in which the carbon atoms alpha to the carbonyl groups in the succinic anhydride groups are connected to each other through a single bond and a liquid mono-oxirane compound containing as its only functional group a single oxirane oxygen atom.

In another embodiment of this invention, the new compositions defined above contain, in addition, a cure accelerator comprising a tertiary amine.

In yet another embodiment of this invention, a new resin composition having excellent solvent resistance properties comprises the reaction product of a mixture of (A) a solid polyanhydride containing at least two succinic anhydride groups and less than three conjugated double bonds when one of the conjugated double bonds is between the carbon atoms alpha to the carbonyl groups in a succinic anhydride group, and (B) a liquid mono-oxirane compound containing as its only functional group a single oxirane oxygen atom, said solid polyanhydride compound being substantially completely dissolved in said liquid mono-oxirane compound to form a liquid solution at about room temperature before curing is substantially complete.

In yet another embodiment of this invention, a new resin composition having excellent solvent resistance properties comprises the reaction product of a mixture of (A) a solid polyanhydride compound containing at least two succinic anhydride groups in which the carbon atoms alpha to the carbonyl groups in the succinic anhydride are connected to each other through a single bond and (B) a liquid mono-oxirane compound containing as its only functional group a single oxirane oxygen atom, said solid polyanhydride compound being substantially completely dissolved in said liquid mono-oxirane compound to form a liquid solution at about room temperature before curing is substantially complete.

One of the components of the compositions of this invention is a solid compound containing at least two succinic anhydride groups and less than three conjugated double bonds when one of the conjugated double bonds is between the carbon atoms alpha to the carbonyl groups in a succinic anhydride group. In other words, one of the components of the compositions of this invention is a solid compound containing at least two anhydride groups where the carbon atoms alpha to the carbonyl groups in the anhydride are connected to each other through a bond selected from the group consisting of a single bond and a double bond and wherein said solid compound contains less than three conjugated double bonds when one of the conjugated double bonds is between the carbon atoms alpha to said carbonyl groups. By the term "conjugated double bonds" in this application is meant only conjugated carbon to carbon double bonds.

It is preferred that in the solid compound component containing at least two succinic anhydride groups, that the carbon atoms alpha to the carbonyl groups in the succinic anhydride be connected to each other through a single bond. At least two succinic anhydride groups are required to obtain proper cross-linking of the solid compound with the liquid monomeric organic oxirane compound to be defined below. In addition, the solid polyanhydride compounds are defined so as to exclude aromatic polyanhydrides where the carbon atoms alpha to the carbonyl groups in the anhydride group are a part of an aromatic ring. Such aromatic polyanhydrides have been found unsuitable to form the compositions of this invention as they are substantially insoluble in the liquid monomeric organic oxirane compound.

The solid polyanhydrides for use in the compositions of this invention can be prepared in any suitable manner. One suitable procedure is to polymerize an unsaturated derivative of succinic anhydride with itself or with another olefinic compound. By an unsaturated derivative of succinic anhydride is meant any organic compound comprising a succinic anhydride group and at least one carbon to carbon double bond. By a succinic anhydride group is meant the group represented by Formula I below:

FORMULA I

The carbon to carbon double bond can occur in the Formula I above between the carbon atoms alpha to the carbonyl groups in the succinic anhydride group or the carbon to carbon double bond can occur in the groups attached to the carbon atoms alpha to the carbonyl groups in the succinic anhydride group. For example, the solid polyanhydrides can be prepared by the homopolymerization of succinic anhydride derivatives represented by the general Formulas II through VII below.

FORMULA II

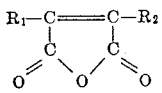

where $R_1$ is a member selected from the group consisting of hydrogen, halogen, a hydrocarbon radical and a substituted hydrocarbon radical; and $R_2$ is selected from the group consisting of hydrogen and halogen atoms. By the term "hydrocarbon radical" in this specification is meant any group of atoms consisting of carbon and hydrogen, such as alkyl, cycloalkyl, aryl, alkaryl, and aralkyl. Unless otherwise indicated, the term "alkyl" is meant to include only saturated groups. The term "hydrocarbon radical" is therefore intended to substantially exclude olefinic unsaturation in the radicals unless otherwise indicated. By the term "substituted hydrocarbon radical" in the specification is meant where one or more atoms in the hydrocarbon radical have been exchanged for a halogen; —C≡N; OR group where R is any hydrocarbon radical as defined above; or

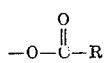

where R is any hydrocarbon radical as defined above. Examples of suitable anhydrides having the above formula are as follows:

maleic anhydride;
chloromaleic anhydride ;
methylmaleic anhydride;
ethylmaleic anhydride;
hexymaleic anhydride;
pentadecylmaleic anhydride;
octacosylmaleic anhydride;
4-propyl-8-methyl-eicosylmaleic anhydride;
cyclohexylmaleic anhydride;
phenylmaleic anhydride;
diphenylmaleic anhydride;
naphthylmaleic anhydride;
4-propyl-1-naphthylmaleic anhydride;
4-cyclohexytridecylmaleic anhydride;
orthotolylmaleic anhydride;
paraethylphenylmaleic anhydride;
benzylmaleic anhydride;
dibromomaleic anhydride;
bromochloromaleic anhydride;
1-chloro-2-methylmaleic anhydride;
1-bromo-2-heptylmaleic anhydride;
1-chloro-2-heptadecylmaleic anhydride;
1-chloro-2-heptacosylmaleic anhydride;
1-chloro-2-cyclohexylmaleic anhydride;
1-bromo-2-phenylmaleic anhydride;
1-chloro-4-p-decylphenylmaleic anhydride;
1-chloro-2-heptylmaleic anhydride;
chloromethylmaleic anhydride;
3-bromooctylmaleic anhydride;
phenoxymethylmaleic anhydride;
phenoxydocosylmaleic anhydride;
6-pentanoxyoctylmaleic anhydride;
1-chloro-2(2-phenoxyethyl)maleic anhydride;
cyanoethylmaleic anhydride;
4-cyanononylmaleic anhydride; and
1-bromo-2-(3-cyanohexyl)maleic anhydride.

FORMULA III

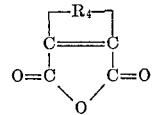

where $R_4$ is selected from the group consisting of a divalent hydrocarbon radical having between 2 and 5 cyclic carbon atoms and a substituted divalent hydrocarbon radical having between 2 and 5 cyclic carbon atoms. The total number of carbon atoms in $R_4$ can be between 3 and 36 and is preferably between 4 and 16. Examples of suitable compounds having the above Formula III are as follows:

1,2-dicarboxyliccyclobutene anhydride;
1,2-dicarboxyliccyclopentene anhydride;
1,2-dicarboxyliccyclohexene anhydride;
1,2-dicarboxyliccycloheptene anhydride;
1,2-dicarboxylic-4-chlorocyclopentene anhydride;
1,2-dicarboxylic-4-methylpentene anhydride;
1,2-dicarboxylic-4-octylcyclohexene anhydride;
1,2-dicarboxylic-5-octacosylcycloheptene anhydride;
1,2-dicarboxylic-5-cyanocyclohexene anhydride;
1,2-dicarboxylic-4-pentyl-5-octylcyclohexene anhydride; and
1,2-dicarboxylic - 4(2-chloropentyl) - cyclohexene anhydride.

FORMULA IV

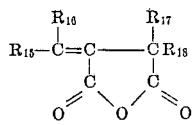

where $R_{15}$, $R_{16}$, $R_{17}$ and $R_{18}$ can be the same or different and are selected from the group consisting of hydrogen, halogen, a hydrocarbon radical and a substituted hydrocarbon radical. Examples of suitable compounds having the above Formula IV are as follows:

itaconic anhydride;
1,2-dicarboxylic-pentene-2 anhydride;
1,2-dicarboxylic-octene-2 anhydride;
1,2-dicarboxylic-tetradecene-2 anhydride;
1,2-dicarboxylic-eicosene-2 anhydride;
1,2-dicarboxylic-4-methyloctene-2 anhydride;
1,2-dicarboxylic-octadecene-2 anhydride;
2,4-dimethyl-3,4-dicarboxylic-pentene-2 anhydride;
1,1-dimethyl-1,2-dicarboxylic-octene-2 anhydride;
1,2-dicarboxylic-3-cyanohexene-2 anhydride; and
1,2-dicarboxylic-4-bromoeicosene-2 anhydride.

FORMULA V

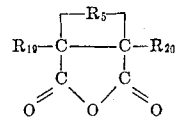

where $R_{19}$ and $R_{20}$ can be the same or different and are selected from the group consisting of hydrogen, halogen, a hydrocarbon radical, and a substituted hydrocarbon radical; and $R_5$ is a member selected from the group consisting of an unsaturated divalent hydrocarbon radical having between 3 and 5 carbon atoms wherein the unsaturation occurs between any two adjacent cyclic carbon atoms and an unsaturated substituted divalent hydrocarbon radical having between 3 and 5 cyclic carbon atoms wherein the unsaturation occurs between any two adjacent cyclic carbon atoms. The total number of carbon atoms in $R_5$ can be between 3 and 36 and is preferably between 4 and 10. Compounds having the structure according to Formula V above can be prepared by the Diels-Alder reaction between a conjugated diene and maleic anhydride. For example, cyclopentadiene and maleic anhydride react to form Nadic anhydride. Castor oil also reacts with maleic anhydride to form adducts corresponding to Formula V. Examples of other suitable compounds having the above Formula V include:

bicyclo(2.2.1)5-heptene-2,3-dicarboxylic anhydride;
cis-4-cyclohexene-1,2-dicarboxylic anhydride;
7 - oxabicyclo(2.2.1)5 - heptene - 2,3 - dicarboxylic anhydride;
4-methyl-4-cyclohexene-1,2-dicarboxylic anhydride;
bicyclo(2.2.2)1-octene-4,5-dicarboxylic anhydride; and
2-styryl-5-phenyl-1-cyclohexene-3,4-dicarboxylic anhydride.

FORMULA VI

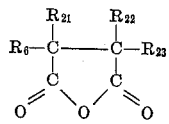

where $R_{21}$, $R_{22}$, and $R_{23}$ can be the same or different and are selected from the group consisting of hydrogen, halogen, a hydrocarbon radical, and a substituted hydrocarbon radical; and $R_6$ is a member selected from the group consisting of an unsaturated hydrocarbon radical and an unsaturated substituted hydrocarbon radical. Examples of suitable compounds having the above formula are as follows:

propenylsuccinic anhydride;
butenylsuccinic anhydride;
hexenylsuccinic anhydride;
dodecenylsuccinic anhydride;
eicosenylsuccinic anhydride;
isopropenylsuccinic anhydride;
octenylsuccinic anhydride;
octadecenylsuccinic anhydride;
1-dodecenyl-2-chlorosuccinic anhydride;
1,2-dichlorododecenylsuccinic anhydride;
1,1-dipropyl-2-methyl-2-propenylsuccinic anhydride; and
1-octyl-1-bromo-2-butyl-2-dodecenylsuccinic anhydride.

FORMULA VII

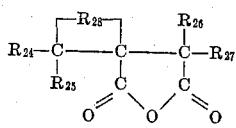

where $R_{24}$, $R_{25}$, $R_{26}$ and $R_{27}$ can be the same or different and are selected from the group consisting of hydrogen, halogen, a hydrocarbon radical and a substituted hydrocarbon radical; and $R_{28}$ is an unsaturated divalent hydrocarbon radical having four cyclic carbon atoms. The total number of carbon atoms in compounds having the Formula VII above can be between 9 and 40 and is preferably between 9 and 16. These compounds can suitably be prepared by the Diels-Alder reaction between a conjugated diene and itaconic and substituted itaconic anhydrides.

In the compounds represented by Formulas II, IV, V, VI and VII above, where R, $R_1$, $R_2$, $R_6$, and $R_{15}$ through $R_{27}$ are selected from the group consisting of hydrocarbon and substituted hydrocarbon radicals, they can have between 1 and 30 and preferably between 1 and 15 carbon atoms. The total number of carbon atoms per molecule for any particular compound represented by Formulas II through VII above can be between 4 and 40 and is preferably between 4 and 20.

In addition to the homopolymerization of the unsaturated succinic anhydride compounds defined above, the solid polyanhydrides can be prepared by the copolymerization of an unsaturated succinic anhydride compound such as defined above with (1) each other, i.e. copolymerization of mixtures of unsaturated succinic anhydride compounds, or (2) with any other organic monoolefin compound. For example, the unsaturated succinic anhydride compounds can be copolymerized with olefinic compounds as represented by the general Formula VIII below:

FORMULA VIII

where $R_3$ is selected from the group consisting of hydrogen, halogen, a hydrocarbon radical and a substituted hydrocarbon radical; and $x_1$ and $x_2$ are selected from the group consisting of hydrogen, halogen, a hydrocarbon radical, a substituted hydrocarbon radical and —OR where R is any hydrocarbon radical as defined above. The olefinic compound suitably has between 2 and 40 carbon atoms per molecule, preferably between 2 and 30, and more preferably between 6 and 20 carbon atoms per molecule.

The preferred olefinic compounds for use in forming the solid polyanhydride component of the compositions of this invention are those where $R_3$ in the above general formula is hydrogen and the sum of the carbon atoms in $x_1$ and $x_2$ is less than 28. The most preferred olefinic compounds are the aliphatic alpha monoolefins and in particular the straight-chain alpha monoolefins having between 2 and 30 carbon atoms per molecule.

It is understood that the term "olefin" is meant to include mixtures of monoolefins having between 2 and 40 carbon atoms per molecule, such as those obtained by the thermal or catalytic cracking of petroleum stocks. It is desirable that only one olefinic bond per molecule be present in the anhydride or the olefin since more than one double bond per molecule promotes gel formation and internal cross-linking. Minor amounts of diolefins, on the order of two percent or less, can, however, be tolerated in the anhydride and olefin.

Examples of olefin compounds or mixtures of olefins suitable to form the solid polyanhydride components of the compositions of this invention include:

ethylene;
propylene;
1-butene;
2-butene;
1-pentene;
2-pentene;
2-methyl-1-butene;
1-hexene;
3-hexene;
4-methyl-1-pentene;
1-heptene;
3-ethyl-2-pentene;
3,3-dimethyl-1-pentene;
1-octene;
2-methyl-1-heptene;
3,3-dimethyl-1-hexene;
1-nonene;
4-nonene;
4,4-dimethyl-1-heptene;
1-decene;
2-decene;
1-undecene;
2-methyl-4-propyl-3-heptene;
1-dodecene;
1-tridecene;
1-tetradecene;
tetraisobutylene;
1-octadecene;
1-eicosene;
2-methyl-1-nonadecene;
1-docosene;
1-heptacosene;
1-hentriacontene;
3-heptadecyl-2-eicosene;
styrene;
methyl acrylate;
ethyl acrylate;
vinylchloride;
methylvinyl ether;
vinyl acetate;
methylvinyl acetate;
vinyl naphthalene;
allyl chloride;
acrolein;
acrylic acid;
p-bromostyrene;
p-chlorostyrene;
cyclohexyl acrylate;
2,5-dichlorostyrene;
2-ethylhexyl acrylate;
p-isopropylstyrene;
allylisothiocyanate;
allyl laurate;
allyl stearate;
2-ethoxyethyl acrylate;
4-ethoxystyrene;
4-methoxystyrene;
p-nitrostyrene;
octadecyl acrylate;
phenyl acrylate;
isopropyl acrylate;
sodium acrylate;
2,2,3,3-tetrafluoropropyl acrylate;
vinylacetic acid;
vinyl benzoate;
vinyl-2-butoxyethyl ether;
vinyl n-butyl ether;
vinyl butyrate;
vinyl chloroacetate;
vinyl-2-chloroethyl ether;
vinyl n-decanoate;

vinyl ethyl ether;
vinyl formate;
methyl vinyl ketone;
ethyl vinyl ketone;
alphamethylstyrene;
2-methylpentene-1;
2-methylbutene-1;
benzyl methacrylate;
methyl methacrylate;
n-butyl methacrylate;
alpha-chlorostyrene;
alpha-chloroacrylonitrile;
2-chloroethyl methacrylate;
2-cyanoacrylamide;
n-decyl methacrylate;
vinylidene cyanide;
diethyl itaconate;
vinylidene chlorobromide;
isopropenyl propionate;
isopropenyl butyrate;
2-ethoxyethyl methacrylate;
ethyl-alpha-bromoacrylate;
isopropenyl acetate;
methacrolein;
methacroyl acetone;
methacrylic acid;
octadecyl methacrylate;
2-phenylethyl methacrylate;
isopropyl methacrylate;
sodium methacrylate;
2,2,3,3-tetrafluoropropyl methacrylate;
tetrahydrofurfuryl methacrylate;
vinylidene chloride;
crotonic acid;
beta-chlorostyrene;
crotyl bromide;
diethyl maleate;
dilauryl maleate;
ethyl crotonate;
fumaronitrile;
methyl crotonate;
cinnamoyl chloride;
crotyl alcohol;
diamyl maleate;
di-n-butyl fumarate;
diethyl fumarate;
di-2-ethylhexyl fumarate;
di-iso-octyl fumarate;
di-iso-octyl maleate;
dimethyl maleate;
dibutyl maleate;
citraconic acid; and
beta,beta-dimethylacrylic acid.

One preferred form of the solid polyanhydride can be represented by the general formula:

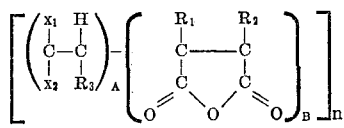

where $R_1$, $R_2$, $R_3$, $x_1$ and $x_2$ are as defined above; $n$ is an integer having a value from about 2 to about 100, or higher and preferably from 2 to about 30; A is an integer having a value from 0 to 100 and B is an integer selected from the group consisting of 1 and 2.

In the copolymerization of the unsaturated succinic anhydride with the olefin compounds as defined, at least two unsaturated succinic anhydride compounds must, of course, be incorporated therein in order to produce a solid polyanhydride having at least two succinic anhydride groups therein.

The polymerization or copolymerization can be conducted in any suitable manner. One suitable copolymerization procedure involves contacting the olefinic compound with the anhydride in a suitable solvent in the presence of a free radical producing catalyst, such as a peroxide. The ratio of the olefinic compound to the anhydride can vary over a wide range but is generally between about 1:1 and 5:1, with preferred ranges between 1:1 and 3:1. The particularly preferred molar ratio of olefin to anhydride compound will depend to a large extent on the specific olefins and anhydrides employed. For example, for the copolymerization of aliphatic mono-alpha-olefins and maleic anhydride, the ratio of olefin to anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used in which case much lower temperatures, i.e. —80° C., can be employed. The upper reaction temperature is determined by the boiling point of the components of the reaction mixture and the predominance of unwanted side reactions, such as polymerization.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g., or higher, but the preferred pressure is atmospheric.

The copolymers can be produced in any suitable solvent which at least partially dissolves both of the reacting components. Suitable solvents include, for example:

n-pentane
n-hexane
n-octane
methylene chloride
tetrahydrofuran
di-isopropyl ether
carbon tetrachloride
cyclohexane
methylcyclohexane
n-propylacetate
toluene
benzene
ethylbenzene
cumene
xylene
ethyl-n-butyrate
tetrachloroethylene
di-n-butylether
n-amylacetate
anisol
cyclohexanone
bromobenzene
methylorthotolylether
acetone
methylethylketone
and
ethylbenzylether The catalyst to employ can be any free radical producing material well known in the art. Preferred catalysts are the organic peroxides, such as benzoyl, lauryl and tertiary butyl peroxide. Other suitable free radical producing materials include substituted azo compounds, such as alpha-alpha'-azobisisobutyronitrile.

The molecular weight of the polyanhydride component of the compositions of this invention can vary over a wide range. The dilute solution viscosity (which is a measure of molcelular weight) of five grams of the polyanhydride per deciliter of acetone at 77° F. can suitably be between about 0.01 and 2 or more, and is preferably between about 0.03 and 0.95 deciliters per gram.

The solid polyanhydride compounds described above are dissolved in a liquid mono-oxirane compound containing as its only functional group a single oxirane oxygen atom, i.e. a liquid monoepoxide, to produce the new compositions of this invention. By a functional group is meant a group such as an oxirane oxygen atom which would participate in the anhydride-monoepoxide crosslinking reaction, i.e. combine chemically with the anhydride, such as for example, —OH, —SH, and —NH groups. One preferred class of liquid organic mono-oxirane compounds can be represented by the general Formula IX below:

FORMULA IX

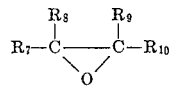

where $R_7$, $R_8$ and $R_9$ are selected from the group consisting of hydrogen, a hydrocarbon radical as defined above, a substituted hydrocarbon radical as defined above and —OR, where R is any hydrocarbon radical as defined above; and $R_{10}$ is selected from the group consisting of a hydrocarbon radical as defined above, a substituted hydrocarbon radical as defined above and —OR, where R is any hydrocarbon radical as defined above; and wherein the term "alkyl" for $R_7$, $R_8$, $R_9$ and $R_{10}$ includes both saturated and unsaturated groups. When the monoepoxide is unsaturated, that is, when the monoepoxide contains one or more olefinic double bonds, the unsaturation should, of course, be such that the unsaturated monoepoxide will not homopolymerize under the conditions of curing to form a di- or polyepoxide before the monoepoxide crosslinks with the polyanhydride. The total number of carbon atoms in the monoepoxide compound should be such that the compound is liquid at room temperature. In general, the number of carbon atoms is suitably between about 3 and about 20 and preferably between about 3 and 10 per molecule.

The preferred oxirane compounds are the so-called terminal monoepoxides which are represented by the above Formula IX when $R_7$ and $R_8$ are hydrogen. When terminal epoxides are used, it is preferred that $R_{10}$ be selected from the group consisting of phenyl, —OR where R is as defined above, saturated aliphatic radicals having between 1 and 18 carbon atoms, and halogen substituted alkyl groups.

As noted above the oxirane compound must be liquid at room temperature in order to dissolve the solid polyanhydride compounds defined above. Examples of suitable oxirane compounds include:

methyl glycidyl ether;
butyl glycidyl ether;
octyl glycidyl ether;
2-propyloctyl glycidyl ether;
phenyl glycidyl ether;
allyl glycidyl ether;
3-methylpent-1-ene glycidyl ether;
isopropyl glycidyl ether;
1,2-epoxy-3-chloropropane(epichlorohydrin);
2,3-epoxy-2,4-dimethyl-4-chlorobutane;
1,2-epoxy-3-chlorobutane;
1,2-epoxy propane;
1,2-epoxy butane;
1,2-epoxy hexane;
1,2-epoxy hex-5-ene;
1,2-epoxy decane;
1,2-epoxy-7-propyldecane;
1,2-epoxy-4-ethylhex-5-ene;
1,2-epoxy dodecane;
1,2-epoxy-5-chlorododecane;
1,2-epoxy octadecane;
1,2-epoxy eicosane;
1,2-epoxy triacontane;
1,2-epoxy tetracontane;
1,2-epoxy-3-bromopropane(epibromohydrin);
monoepoxidized soy bean oil;
monoepoxidized 2-ethylhexyl tallate;
glicidyl benzoate;
glycidyl-para-methylbenzoate;
glycidyl acetate;
limonen oxide;
cyclohexene oxide;
7,8-epoxyhexadecane;
7,8-epoxyhexadec-4-ene;
3,4-epoxyhexane;
2,3-epoxy-2,3-dimethylbutane;
2,3-epoxy-2-phenylhexane;
1,2-epoxy-2-phenoxypropane; and
1,2-epoxy-2-butoxypropane.

The most preferred oxirane compounds are styrene oxide, epichlorohydrin, 1,2-epoxy-2-phenoxypropane, 1,2-epoxy-2-butoxypropane, and epoxidized straight chain alpha monoolefins having between 3 and 20 carbon atoms per molecule such as 1,2-epoxypropane, 1,2-epoxybutane and 1,2-epoxyoctane; 1,2-epoxydodecane; and 1,2-epoxyeicosane.

The prime criteria for the compositions of this invention is the solubility of the solid polyanhydride in the liquid monoepoxide to form a solution which is liquid at about room temperature, i.e., at temperatures between about 10° and 30° C. A solution is required in order to obtain a hard, infusible resin which is clear, non-grainy and has excellent solvent resistance properties together with good flexural strength and heat distortion temperatures. The time for solution of the polyanhydride in the monoepoxide varies depending on the ratio of the materials in the mixture, the temperature and, of course, the nature of the materials themselves. Thus, while the anhydride to epoxide ratio ($A/E$ ratio) in the final mixture can vary between about 1 to 10 and 1 to 0.5, faster solution of the polyanhydride will occur at the lower $A/E$ ratios. More will be said of this $A/E$ ratio below. In addition, it is sometimes desirable to heat the monoepoxide and polyanhydride to effect a faster solution. Since the use of increased temperatures promotes cross-linking and solidification, the temperatures during this premixing are suitably maintained below about 90° C. and preferably between 50° and 60° C. In any event, the solution on cooling to room temperature would still be liquid.

As noted above, the compositions of this invention are liquid solutions of the defined polyanhydride in the defined monoepoxide at room temperature, i.e., at temperatures between about 10° and 30° C. If these solutions were left to stand long enough, they would cross-link to form a hard, infusible resin. Fortunately, the rate of solution of the defined polyanhydrides is faster than the rate of cross-linking at the solution temperatures defined above. That the polyanhydride should cross-link at all using the monoepoxide as the sole cross-linking agent was surprising in view of the art discussed above. This is so because all polyanhydrides will not react to form hard infusible resins using a monoepoxide as the sole cross-linking agent. For example, pyromellitic dianhydride (PMDA), a commercially available dianhydride will not react using a monoepoxide as the sole cross-linking agent to form a clear, non-grainy hard infusible resin. PMDA and other similar polyanhydrides will apparently not work because they are substantially insoluble in the liquid monoepoxides. It is critical therefore that the defined polyanhydrides be soluble in the defined liquid monoepoxides at about room temperature to form a liquid solution if a clear, non-grainy finished resin is to be obtained.

It has been found that when straight chain alpha olefins are employed to prepare the monomeric oxirane compound (monoepoxide) by epoxidation and the solid polyanhydrides are prepared by the copolymerization of maleic anhydride and straight chain alpha olefins, the size of the straight chain alpda olefins used in preparing the monoepoxide and polyanhydride becomes important in order for the monoepoxide to solubilize the polyanhydride. In general, the solubility of maleic anhydride-alpha olefin copolymers increases as the carbon number of the alpha olefin increases. In addition, the solvent power or ability of the monoepoxide to solubilize the polyanhydride decreases as the carbon number of the alpha olefins used to prepare the monoepoxide increases. For example, propylene oxide and butylene oxide appear to be suitable solvents for substantially any maleic anhydride-alpha-olefin copolymer. On the other hand, when the monoepoxide is prepared by the epoxidation of a straight chain alpha olefin having eight carbon atoms or more per molecule, the straight chain alpha olefin used to prepare the polyanhydride must have at least eight carbon atoms per molecule. In any event, in order to form the compositions of this invention the polyanhydride must be substantially completely dissolved in the liquid monomeric oxirane compound to form a liquid solution at about room temperature before solidification of a mixture of the polyanhydride and monoepoxide.

The ratio of the polyanhydride to monoepoxide compound to employ in the compositions of this invention can vary over a wide range. The specific ratio to employ with any given polyanhydride or monoepoxide is determined, first of all, by whether a liquid solution of the polyanhydride in the monoepoxide is obtained at room temperature. The liquid solution of polyanhydride in the monoepoxide hardens by a cross-linking reaction, and the reaction product is a network of ester and ether linkages having substantially no carboxylic acid groups therein. The ester linkages are believed to form through the interaction of the anhydride and epoxide groups while the ether linkages are believed to form through the interaction of several epoxide groups Since the liquid organic monomeric oxirane compound contains only one oxirane oxygen atom as its only functional group, one equivalent of the mono-oxirane compound is equivalent to one mole.

The anhydride equivalent of the polyanhydride is defined as the average number of anhydride groups per molecule. In order to form thermosetting compositions, the polyanhydride must have an anhydride equivalency of at least two, that is, the polyanhydride must have at least two anhydride groups per molecule. The anhydride to epoxide ratio, known more simply as the A/E ratio, can therefore vary between about 0.1:1 and 2:1, but is preferably between 0.5:1 and 1:1 for the best physical and chemical properties.

One of the features of the liquid compositions of this invention is that they can be cross-linked or cured at relatively low temperatures and pressures. A hardening or curing of the resins can suitably be effected at a temperature between about 0° C. and 110° C. at atmospheric pressure. Higher pressures can be used if desired but provide no additional benefits. Higher curing temperatures, for example, up to 200° C. or more can be used, but higher temperatures promote evaporation of one or the other of the components of the composition resulting in undesirable bubble formation or other difficulties. The preferred curing temperatures are between 50° C. and 100° C.

The time for the curing or hardening of the liquid compositions of this invention will vary over a wide range depending on the reactivity of the particular monoepoxides and polyanhydrides employed. The solution of the polyanhydride in the monoepoxide, in general, will not cure at room temperature over reasonable lengths of time of say one to 24 hours. Either higher curing temperatures, as defined above, must be employed or an accelerator, as defined below, can be employed to increase the rate of curing.

It has been found that the curing or cross-linking reaction can be accelerated by the use of various materials. Several Friedel-Crafts type salts, such as ferric chloride and lithium chloride, while accelerating the production of a solid product, are undesirable in that they are insoluble in the polyanhydride-monoepoxide system and, in addition, result in a solid which is softer than desired. Other materials, such as $BF_3$ complexes, salts of tertiary amines, picolinic acid and concentrated $NH_4OH$, while soluble in the monoepoxide system are undesirable in that the cured products are softer than desired.

Primary and secondary amines, concentrated HCl, NaOH and oxalic acid either do not function at all as accelerators or react with a polyanhydride-monoepoxide to form undesired products.

It has been found that soluble tertiary amines as a class are unique in accelerating the curing of the compositions of this invention to solids of desired hardness. One suitable class of tertiary amines can be represented by the general formula:

FORMULA X

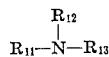

where $R_{11}$, $R_{12}$ and $R_{13}$ can be the same or different and can be selected from the group consisting of a hydrocarbon radical as defined above having between 1 and 37 carbon atoms, and a substituted hydrocarbon radical as defined having between 1 and 37 carbon atoms; and wherein the sum of the carbon atoms in $R_{11}$, $R_{12}$ and $R_{13}$ is less than 40; and wherein the term "alkyl" for $R_{11}$, $R_{12}$ and $R_{13}$ includes both saturated and unsaturated groups. Examples of suitable tertiary amines having the above Formula X include:

trimethylamine;
triethylamine;
N,N-dimethylaniline;
tri-n-hexylamine;
tri-n-heptylamine;
triphenylamine;
tri-n-decylamine;
alpha-methylbenzyldimethylamine;
N,N-diethylaniline;
N-ethyl-N-phenylbenzylamine;
N,N-dimethylbenzylamine;
N,N-diethylallylamine;
N,N-dimethylcyclohexylamine;
N,N-diphenylmethylamine;
N-methyl-N-phenylbenzylamine;
N,N-dimethyl-p-nitrosoaniline;
meta-diethylaminophenol;
dimethylaminomethylphenol;
N,N-diethyldodecylamine;
tridimethylaminomethylphenol;
dimethylaminoethyl methacrylate;
N,N-di-n-propylaniline;
N,N-diethyl-o-toluidine;
N,N-diethyl-p-toluidine;
N,N-dimethyl-1-naphthylamine;
N,N-diethyl-1-naphthylamine;
N-ethyl-N-methylaniline;
p-bromo-N,N-dimethylaniline;
p-bromo-N,N-diethylaniline;
N,N-dimethyl-m-toluidine;
N,N-diethyl-m-toluidine;
N,N-diethyl-2,4-dimethylaniline;
p-chloro-N,N-diethylaniline;
N,N-diethyl-2,5-dimethylaniline;
N-benzyl-N-ethyl-m-toluidine;
N,N-alpha-trimethylbenzylamine;
tri-n-propylamine;
tri-n-butylamine;
tri-isopentylamine;
tri-pentylamine;
N,N-dimethyloctadecylamine;
N,N-dimethyl-2-ethylhexylamine;
trioctylamine; and
tridodecylamine.

Pyridines are also suitable as accelerators and can be represented by Formula XI below:

FORMULA XI

where $R_{14}$ can be selected from the group consisting of hydrogen, a hydrocarbon radical as defined above having between 1 and 10 carbon atoms, and a substituted hydrocarbon radical as defined having between 1 and 10 carbon atoms; and wherein the term "alkyl" includes both saturated and unsaturated groups. Examples of suitable tertiary amines having the above Formula XI include:

2-allylpyridine
3-ethylpyridine
4-ethylpyridine
2-benzylpyridine
2-isopropylpyridine
4-phenylpyridine
3-bromopyridine
2-chloropyridine
vinylpyridine
and
3-picoline While the monosubstituted pyridines are preferred, the more highly substituted pyridines can also be employed, such as, for example:

3,5-dicyanopyridine
3,5-dimethylpyridine
3-cyano-4-methylpyridine
and
2,4,6-trimethylpyridine Examples of other suitable tertiary amines include:
N,N-dimethyl-m-nitroaniline;
N,N-diethyl-m-phenetidine;
N,N-diethyl-o-nitroaniline;
N,N-diethyl-3,4-dinitroaniline;
N,N,N',N'-tetramethylmethylene diamine;
N,N,N',N'-tetramethyl-1,3-butane diamine;
N,N,N',N'-tetraethylethylene diamine;
triethylene diamine;
1,2,3-triphenylquanidine;
quinoline;
quinaldine;
2,6-dimethylquinoline;
6-nitroquinoline;
2-chloroquinoline;
2,2'-biquinoline;
isopyrrole;
1,3-isodiazole;
oxazole;
isothiazole;
1,2,3-oxadiazole;
1,2,5-oxadiazole;
1,2,3,4-oxatriazole;
1,2,3,4,5-dioxadiazole;
1,2,3,4-trioxazole;
pyridazine;
1,2,3-triazine;
1,2,3,4-tetrazine;
pentazine;
1,2,4-oxazine;
1,4-oxazine;
indolenine;
4-pyrindine;
indiazene;
indoxazine;
benzoxazole;
benzoxadiazole;
benzofurazan;
cinnoline;
quinazoline;
quinoxaline;
pyrido[3,2-b]pyridine;
pyrido[4,3-b]pyridine;
naphthyridine;
phthalazine;
phenotriazine;
1,2,4-benzotriazine;
acridine; and
phenazine.

The amount of the tertiary amine accelerator to employ is not critical, amounts on the order of about 0.1 and 20 parts of amine catalyst per 100 parts of polyanhydride-monoepoxide solution being satisfactory. The preferred range of accelerator concentration is between 0.5 and 5 parts of amine catalyst per 100 parts of polyanhydride-monoepoxide solution. The more amine catalyst that is used, the faster the rate of cure, and the curing is an exothermic reaction. When the higher concentration of amine is employed, it is preferred that means be also employed to remove the exothermic heat of reaction to avoid any possible charring of the product. For example, one suitable method to remove the heat of the curing reaction more quickly is to form the reaction mixture into a film.

The use of a tertiary amine accelerator and particularly the use of the alkyl substituted anilines and pyridines results in much faster cures.

The method of addition of the tertiary amine accelerators is critical. They must be added to the mixture of polyanhydride and monoepoxide after the polyanhydride is dissolved in the monoepoxide, since it normally takes longer for the solution of the polyanhydride in the monoepoxide than for the amine accelerators to harden the mixture. Consequently, if the amine is added first to the monoepoxide and the polyanhydride added to this mixture, the composition may harden before all of the polyanhydride is dissolved, and a grainy composition with inferior chemical and physical properties will result.

This invention will be further described with relation to the specific examples to be given below.

In many of the examples to follow, the polyanhydride compound was prepared by the copolymerization of maleic anhydride and an alpha olefin having between 3 and about 26 carbon atoms per molecule. These copolymers were prepared by reacting the desired olefin and maleic anhydride in a molar ratio of 2:1 in the liquid phase in the presence of a mutual solvent at a temperature between 60° and 100° C. using as a catalyst between 2 and 3 weight percent of benzoyl peroxide based on the maleic anhydride. The copolymer was then (1) separated from the solvent and any residual catalyst, and (2) dried.

In a first series of experiments, various maleic anhydride copolymers as defined in Table I below were added to different liquid monoepoxide compounds as shown in Table I at room temperature and stirred until a solution was obtained. The amount of copolymer was such that the final solution had an A/E ratio of 0.5 except for Examples 2 and 3 where the A/E ratio was 1.0. The solutions were then cured thermally at the temperature and for the times shown in Table I below.

TABLE I

| Example No. | Olefin used to copolymerize with maleic anhydride to make solid polyanhydride | Monoepoxide | Cure Conditions | | Results |
|---|---|---|---|---|---|
| | | | Temp., °C. | Time, hrs. | |
| 1 | $C_{20-26}$ n-alpha-olefin mixture | Epoxidized $C_{12-16}$ n-alpha-olefin mixture | 150 | 24 | Flexible solid. |
| 2 | do | Monoepoxidized soy bean oil | 150 | 24 | Do. |
| 3 | do | Monoepoxidized 2-ethylhexyl-tallate | 150 | 24 | Do. |
| 4 | Hexene-1 | Epichlorohydrin | 50 | 8 | Hard solid. |
| 5 | do | Phenyl glycidyl ether | 150 | 24 | Do. |
| 6 | Tetradecene-1 | Styrene oxide | 100 | 3 | Do. |
| | | then | 125 | 1 | |

Referring to Table I, flexible and hard solids can be obtained, depending on the size of the reacting molecules. In Examples 1, 2 and 3, relatively long chain olefins were used to prepare the maleic anhydride copolymers and the monoepoxides, and the resulting cross-linked products were flexible solids. In Examples 4, 5 and 6, one or both of the components were prepared from relatively short chain olefins, and the resulting cross-linked products were hard solids.

A number of examples were run as shown in Table II below where the particular polyanhydrides employed were not soluble in the particular monoepoxides employed.

TABLE II

| Example No. | Olefin used to copolymerize with maleic anhydride to make solid polyanhydride | Monoepoxide | Cure Conditions | | Results |
|---|---|---|---|---|---|
| | | | Temp., °C | Time, hrs. | |
| 7 | Hexene-1 | Epoxidized $C_{12-16}$ n-alpha olefin mixture | | | Insoluble. |
| 8 | do | Monoepoxidized soy bean oil | | | Do. |
| 9 | do | Monoepoxidized 2-ethylhexyl-tallate | | | Do. |
| 10 | Propylene | Styrene oxide | | | Do. |
| 11 | do | Phenyl glycidyl ether | | | Do. |
| 12 | Methyl vinyl ether | do | | | Do. |
| 13 | do | Monoepoxidized 2-ethylhexyl-tallate | | | Do. |
| 14 | Hexene-1 | 1,2-epoxyoctane | | | Do. |
| 15 | do | 1,2-epoxydodecane | | | Do. |

The data in Table II show that it is extremely difficult to predict which particular polyanhydrides will dissolve substantially completely in which monoepoxides. It should be noticed, however, that epoxidized 2-ethylhexyltallate was soluble in a maleic anhydride-$C_{20}$—$C_{26}$ alpha-olefin copolymer to produce a flexible solid product as shown in Example 3 in Table I while the same epoxidized 2-ethylhexyltallate was insoluble in a maleic anhydride-hexene-1 copolymer as shown in Example 9 in Table II above, or in a maleic anhydride-methyl vinyl ether copolymer as shown in Example 13 in Table II. The same situation occurs with respect to monoepoxidized soy bean oil, as can be seen by comparing Example 2 in Table I with Example 8 in Table II. In example 2 the monoepoxidized soy bean oil was soluble in the maleic anhydride-$C_{20}$—$C_{26}$ n-alpha-olefin polymer to produce a flexible cured product while the same monoepoxidized soy bean oil was insoluble in the maleic anhydride-n-hexene-1 copolymer as shown in Example 8. Similar results are apparent by comparing Example 1 with Example 7; Example 5 with Examples 11 and 12; and Example 6 with Example 10.

Examples 7, 8, 14 and 15 in Table II show that when the monoepoxide is prepared by the epoxidation of a straight chain alpha olefin having eight carbon atoms or more, a hexene-1-maleic anhydride copolymer is insoluble therein. Examples 1 and 2 in Table I show that monoepoxides prepared from $C_{12-16}$ normal alpha olefins and monoepoxidized soy bean oil are soluble in polyanhydrides made from $C_{20-26}$ normal alpha olefins. Example 14 was repeated except decene-1 was used in place of hexene-1 and a polyanhydride-monoepoxide solution was obtained.

In the examples in Tables I and II and the examples in the tables to follow, the mixture of $C_{20-26}$ normal alpha olefins was composed of about 35 percent $C_{20}$; 30 percent $C_{22}$; 16 percent $C_{24}$; 9 percent $C_{26}$ and 10 percent $C_{26}$ plus.

In another series of experiments, a number of accelerators were evaluated to determine their effectiveness. Unless otherwise indicated, the amount of accelerator employed was 5 parts per 100 parts of resin, the resin being the mixture of polyanhydride and monoepoxide. The samples were cured at room temperature for times varying between 1 hour and several days. The results are shown in Table III below.

TABLE III

| Example Number | Olefin used to copolymerize with maleic anhydride to make solid polyanhydride | Monoepoxide | Anhydride to Epoxide Ratio | Accelerator | Result |
| --- | --- | --- | --- | --- | --- |
| 16 | Propylene | 1,2-epoxybutane | 0.3 | 3-picoline | Hard-Barcol-77. |
| 17 | do | do | 0.5 | DMA [1] | Amber, Hard, Rigid. |
| 18 | do | Epichlorohydrin | 0.5 | Pyridine | Hard, Rigid. |
| 19 | do | do | 0.5 | 3-picoline | Hard. |
| 20 | Hexene-1 | 1,2-epoxypropane | 0.3 | n-Propylamine | Reaction with polymer. |
| 21 | do | do | 0.3 | Dibutylamine | Do. |
| 22 | do | do | 0.3 | Piperidine | Do. |
| 23 | do | do | 0.3 | Ethylene diamine | Do. |
| 24 | do | do | 0.3 | 2-aminoethanol | Do. |
| 25 | do | do | 0.3 | DMA | Solid, very hard. |
| 26 | do | do | 0.2 | DMA | Hard-Barcol-79. |
| 27 | do | 1,2-epoxy-3-isopropoxypropane | 0.3 | 3-picoline | Hard-Barcol-56. |
| 28 | do | 1,2-epoxybutane | 0.3 | Triphenylamine | Hard-Barcol-38. |
| 29 | do | do | 0.3 | N,N-dimethylbenzylamine | Hard-Barcol-66. |
| 30 | do | do | 0.3 | N,N-diethylalkylamine | Hard-Barcol-65. |
| 31 | do | do | 0.3 | 4-ethylpyridine | Hard-Barcol-64. |
| 32 | do | do | 0.3 | N-ethyl morpholine | Hard-Barcol-68. |
| 33 | do | do | 0.3 | 1,2,3-triphenyl guanidine | Hard-Barcol-60. |
| 34 | do | do | 0.3 | 3-picoline | Hard-Barcol-73. |
| 35 | do | do | 0.33 | Tribenzylamine | Hard. |
| 36 | do | do | 0.33 | N,N-diethyl dodecylamine | Hard-Barcol-59. |
| 37 | do | do | 0.33 | Tri-n-hexylamine | Hard Barcol-57. |
| 38 | do | do | 0.33 | Tri-n-heptylamine | Do. |
| 39 | do | Styrene oxide | 0.5 | Pyridine | Hard, rigid. |
| 40 | do | do | 0.5 | DMA | Amber, hard, rigid. |
| 41 | do | Epichlorohydrin | 0.5 | Pyridine | Hard-Barcol-67. |
| 42 | do | do | 0.5 | 3-picoline | Hard-Barcol-73. |
| 43 | do | do | 0.5 | N,N-dimethylcyclohexylamine | Hard Barcol-46. |
| 44 | do | do | 0.5 | DMP-10 [2] | Hard-Barcol-56. |
| 45 | do | do | 0.5 | DMP-30 [3] | Hard-Barcol-54. |
| 46 | do | do | 0.5 | Oxalic acid | No set. |
| 47 | do | do | 0.5 | Concentrated HCl | Do. |
| 48 | do | do | 0.5 | NaOH | Do. |
| 49 | do | do | 0.5 | Pyridine hydrochloride | Barcol 13. |
| 50 | do | do | 0.5 | Picolinic acid | Tacky. |
| 51 | do | do | 0.5 | Trimethylphenyl ammonium iodide | Barcol 0. |
| 52 | do | do | 0.5 | $BF_3$-ethyl ether | Vigorous reaction product charred. |
| 53 | do | do | 0.5 | Ferric chloride | Barcol 0. |
| 54 | do | do | 0.5 | Lithium chloride | Tacky. |
| 55 | do | do | 0.5 | Tetrabutyl ammonuim bromide | Amber, Barcol 0. |
| 56 | do | do | 0.5 | Ethylpyridinium bromide | Amber, Barcol 2. |
| 57 | do | do | 0.5 | Trimethylphenyl ammonium hydroxide | Light yellow Barcol 0. |
| 58 | do | do | 0.5 | Tetramethyl ammonium bromide | Light amber, tacky. |
| 59 | do | do | 0.5 | $BF_3$-etherate (5.5%) in dichloroethyl ether | Amber Barcol 0. |
| 60 | do | do | 0.5 | $BF_3$-etherate (0.125%) in dichloroethyl ether | Light yellow, tacky. |
| 61 | do | do | 0.5 | Concentrated $NH_4OH$ | Do. |
| 62 | do | do | 0.5 | 3-picoline | Hard-Barcol-50. |
| 63 | Diisobutylene | do | 0.33 | do | Do. |
| 64 | Octadecene-1 | 1,2-epoxybutane | 0.33 | do | Barcol 8. |
| 65 | $C_{20-26}$-alpha olefin mixture | do | 0.33 | do | Amber, hard, rigid. |
| 66 | do | do | 0.33 | DMA | Do. |
| 67 | do | Cyclohexene oxide | 0.33 | DMA | Hard. |
| 68 | do | do | 0.33 | 3-picoline | Amber, hard, rigid. |
| 69 | do | Styrene oxide | 0.33 | do | Hard. |
| 70 | do | do | 1.0 | do | Hard, rigid. |
| 71 | do | do | 0.5 | DMA | Do. |
| 72 | do | do | 1.0 | DMA | Do. |
| 73 | do | do | 1.0 | n-Propylamine | Reaction with polymer. |
| 74 | do | do | 1.0 | n-Dodecylamine | Do. |

[1] DMA=N,N,-dimethylaniline.  [2] DMP-10=o-Dimethylaminomethyl phenol.  [3] DMP-30=Tri(demethylaminomethyl) phenol.

Referring to Table III, it can be seen that only the tertiary amines are suitable as accelerators in promoting the curing by a cross-linking reaction of the compositions of this invention to hard, rigid products. Examples 16 through 19 show that a propylene-maleic anhydride copolymer will cross-link with 1,2-epoxybutane and epichlorohydrin in the presence of several different tertiary amines to produce hard, rigid products. Examples 20 through 24 show primary and secondary amines to be unsuitable as accelerators as they react with the polyanhydride to form undesirable amides which do not function as accelerators Examples 25 and 26 show that tertiary amines used in the same system produce the desired solid cross-linked products.

Examples 27 through 45 show the effect of various tertiary amines on several different polyanhydride-monoepoxide systems. In all of these examples, hard, cross-linked products were obtained.

Examples 46 through 48 show that oxalic acid, concentrated HCl and NaOH are unsuitable accelerators.

Examples 49 through 60 give examples of materials other than tertiary amines, which, although accelerating the curing, result in soft or tacky products. Example 52 shows that a $BF_3$-etherate catalyst was too vigorous and resulted in a charred product.

Examples 62 through 72 provide data on additional polyanhydride-monoepoxide systems with various tertiary amines to give hard, rigid products.

Examples 73 and 74 show primary amines again as unsatisfactory as accelerators.

In Examples 41 and 62, only three parts of catalyst were used per hundred parts of resin.

A series of runs were made to show the effect of accelerator concentration. The results are shown in Table IV below.

Example 85

A solution of 25 grams of itaconic anhydride, 0.5 gram benzoyl peroxide and 100 grams of benzene was heated to 83° C. for 12 hours. The polyitaconic anhydride formed as a fine precipitate during the course of the reaction. The precipitate was filtered and washed with benzene. The solid was dried in a vacuum oven at 50° C. The yield of dried polymer was 19.1 grams. To 6.0 grams of the polyitaconic anhydride were added 9.9 grams of epichlorohydrin ($A/E=0.5$) and 7.7 grams acetone. After solution, 0.80 gram (5 percent of resin) of 3-picoline were added and stirred into the solution. The mixture very rapidly got thick and set up to a light brown solid in about one minute.

Example 86

A solution of 25 grams of itaconic anhydride, 25 grams maleic anhydride, 1.0 gram benzoyl peroxide and 200 milliliters of benzene was refluxed for 20 hours. A copolymer formed which was filtered, washed with benzene and dried in a vacuum oven at 50° C. The yield of dried copolymer was 12.8 grams. To 6.0 grams of the copolymer were added 10.6 grams of epichlorohydrin ($A/E=0.5$) and 7.8 grams of acetone. After solution, 0.83 gram (5 percent of resin) of 3-picoline were added and stirred into the solution. The mixture gradually turned a light brown and set up to a solid in about 5 minutes.

Examples 85 and 86 are examples of other types of polyanhydrides which can be employed to form the compositions of this invention. The monoepoxide-polyanhydride solution was rather viscous and the acetone was used as a thinning agent.

The compositions of this invention have been found to

TABLE IV.—ACCELERATOR CONCENTRATION

| Example Number | Copolymer | Epoxide | A:E | Accelerator | Percent | HDT, °C. | Impact ft.-lb./in. of notch | Barcol (935) Hardness |
|---|---|---|---|---|---|---|---|---|
| 75 | Propylene | Butylene | 0.5 | 3-picoline | 1 |  | 0.160 | 62 |
| 76 | do | do | 0.5 | do | 3 |  | 0.328 | 59 |
| 77 | do | do | 0.5 | do | 5 | 63 | 0.335 | 56 |
| 78 | do | do | 0.3 | do | 5 | 75 | 0.144 | 77 |
| 79 | do | do | 0.3 | do | 10 |  |  | 68 |
| 80 | Hexene | Epichlorohydrin | 0.5 | do | 1 | 68 | 0.192 | 73 |
| 81 | do | do | 0.5 | do | 5 | 61 | 0.185 | 73 |
| 82 | do | Butylene | 0.5 | do | 2 | 60 | 0.177 | 70 |

Referring to Table IV, the amount of amine curing agent is not critical for obtaining hard cured resins. There is, however, an effect of accelerator concentration on other physical properties of the resin. The impact strength appears to increase with increased concentrations of accelerator. As noted above, the lowest accelerator concentration which will give a reasonable cure time should be used, and this of course varies with the cure temperature. At room temperature, 2 to 5 parts of accelerator per hundred parts of resin is generally satisfactory with lesser amounts being suitable as the temperature of curing is increased.

Example 83

In this example, pyromellitic dianhydride (PMDA) was added to epichlorohydrin, but the dianhydride was insoluble in the monoepoxide.

Example 84

In this example, 3,4,3′,4′-benzophenone tetracarboxylic dianhydride (BTDA) was added to epichlorohydrin, but the dianhydride was insoluble in the monoepoxide.

Examples 83 and 84 above show that aromatic dianhydrides, wherein the carbon atoms alpha to the anhydride function form a portion of the aromatic ring, are unsuitable for preparing the compositions of this invention.

form excellent castings, however, when it is desired to form the compositions of this invention into continuous films, certain problems are present. Since the film is spread over a relatively large surface area, the monoepoxide component tends to vaporize out of the composition, and thus increase the desired $A/E$ ratio in the final cured film.

It has been found that the rate of evaporation of the monoepoxide from the film depends, among other things, on the boiling point of the monoepoxide, the gelling time of the monoepoxide and the molecular weight of the polyanhydride. By "gelling time" is means the time in which the liquid solution of monoepoxide and polyanhydride react, i.e. cross-link, to form a gel-like material which will not flow. The gel time for any given monoepoxide-polyanhydride system is, of course, affected by the accelerator employed, the $A/E$ ratio, and the cure temperature. While an increased curing temperature tends to promote vaporization of the monoepoxide, the rate of increase in cross-linking (decrease in gelling time) is generally more than a sufficient offset. For purposes of comparing the gel times of various monoepoxides, the standard procedure is to form a liquid solution of the desired monoepoxide with a hexene-1-maleic anhydride copolymer having a dilute solution viscosity in acetone at 77° F. of 0.134, wherein the $A/E$ ratio is 0.5, then add 5 parts per 100 parts of resin of 3-picoline and cure at room temperature until a gel forms. The preferred monoepoxides for the compositions to be used in the preparation of continuous films are those having a boiling point and gelling time such that the A/E ratio in the cured film is substantially the same as the $A/E$ ratio in the uncured liquid mixture, that is, less than 10 weight percent of the monoepoxide evaporates during curing. In general, the slower the gel time of the monoepoxide, the higher must be its boiling point in order to prepare continuous films.

Glycidyl ethers have a slow gel time of greater than 150 minutes in the system described above. As a consequence, the lower boiling glycidyl ethers do not form continuous films due to excess vaporization.

*Example 87*

In the run for this example, a hexene-1-maleic anhydride copolymer having a dilute solution viscosity in acetone at 77° F. of 0.134 deciliter per gram was admixed with allyl glycidyl ether to form a liquid solution having an $A/E$ ratio of 0.5. The allyl glycidyl ether has a gel time of 245 minutes and a boiling point of 125° C. To this solution was added 5 parts per one hundred parts of resin of 3-picoline. The composition was spread on a glass surface to form a thin (0.08 millimeter) film before curing. The film was cured at room temperature for a period of 24 hours. A cracked film was obtained.

*Example 88*

Example 87 was repeated except isopropyl glycidyl ether, having a gel time of 155 minutes and a boiling point of 152° C., was the monoepoxide employed and the composition was spread as a thin film on a glass surface before curing. A cracked film was obtained.

*Example 89*

Example 88 was repeated except phenyl glycidyl ether, having a gel time of greater than 24 hours and a boiling point of 245° C. was employed. A clear continuous film was obtained.

A comparison of Examples 87, 88 and 89 shows that for the slower reacting glycidyl ethers, a higher boiling (Example 89) glycidyl ether must be employed to obtain a continuous film.

As a further example, a 2-methylpentene-1-maleic anhydride copolymer having a dilute solution viscosity as defined above of 0.104 was added to epichlorohydrin so that the $A/E$ ratio was 0.5. To this solution was added 5 phr. of 3-picoline and the resulting mixture spread (1) on a glass surface and cured at 80° C. and (2) on aluminum foil and cured at room temperature. In both instances, a cracked (non-continuous) film was obtained which dissolved in acetone, indicating little cross-linking was effected. Epichlorohydrin boils at 117° C. and its gel time in the hexene-1-maleic anhydride system described above is 45 minutes which is apparently too low to overcome its volatility in this system.

As can be seen from the glycidyl ether data above, continuous film can suitably be prepared from liquid monoepoxides having gel times of greater than 150 minutes by the standard procedure provided the monoepoxide has a boiling point of greater than about 200° C. For monoepoxides having intermediate boiling points of between about 150° C. and 200° C., an intermediate gel time of preferably less than about one hour is satisfactory.

It has also been found quite unexpectedly that the molecular weight of the polyanhydride is important in the compositions of this invention when the production of continuous films is desired from volatile-slow gelling monoepoxides. It has been found that continuous films can be formed from the polyanhydride-volatile monoepoxide compositions when the polyanhydride has a dilute solution viscosity in acetone at 77° F. of greater than 0.2 deciliter per gram. By a "volatile monoepoxide" is meant those monoepoxides which have a boiling point and gelling time by the standard procedure defined above such that more than 10 weight percent of the monoepoxide evoparates during curing. The dilute solution viscosity of the polyanhydride is preferably between 0.3 and 0.5, but can suitably be as high as 2.0 if a volatile carrier solvent as defined below are employed. When monoepoxides are employed which are not volatile under the conditions of curing, the molecular weight of the polyanhydride component is not as important, as noted above in Example 89, where a continuous film was obtained with a low molecular weight polyanhydride.

A series of 2-methylpentene-1, maleic anhydride copolymers of varying molecular weight (dilute solution viscosities) was prepared. Each of these copolymers was added to epichlorohydrin so that the $A/E$ ratio was 0.5. To this solution was added 5 parts per hundred parts of resin of 3-picoline, and the resulting mixture spread on an open glass surface or aluminum foil to test its film forming properties. The results are given on Table V below.

TABLE V.—COATINGS—EFFECT OF MOLECULAR WEIGHT

Copolymer: 2-methylpentene-1, maleic anhydride
Catalyst: 3-picoline
Epoxide: Epichlorohydrin
A:E=0.5

| Example Number | Viscosity, deciliters per gram | Cure, ° C. | Surface | Characteristics |
|---|---|---|---|---|
| 90 | 0.082 | 80 | Glass | Cracks adhesion good. |
| 91 | 0.082 | [1] RT | Al Foil | Do. |
| 92 | 0.104 | 80 | Glass | Do. |
| 93 | 0.104 | RT | Al Foil | Do. |
| 94 | 0.127 | 80 | Glass | Do. |
| 95 | 0.127 | RT | Al Foil | Do. |
| 96 | 0.336 | 80 | Glass | Clear, smooth continuous film. |
| 97 | 0.336 | RT | Al Foil | Do. |

[1] RT=Room Temperature.

Referring to Table V, it can be seen that when the dilute solution viscosity of the copolymer was 0.127 or less, the films cracked (Examples 90 through 95). When the dilute solution viscosity was 0.336 (Examples 96 and 97), a smooth, clear continuous film was obtained on both the glass and aluminum surfaces. The film in Example 96 had a pencil hardness of H.

Similar results were obtained with other low dilute solution viscosity-maleic anhydride copolymers, such as hexene-1; decene-1; and octadecene-1 copolymers when cross-linked with epichlorohydrin, that is, noncontinuous cracked films were obtained. A high molecular weight propylene-maleic anhydride copolymer (dilute solution viscosity of 0.24 deciliter per gram) resulted in the production of a clear, continuous film when cross-linked with epichlorohydrin using 3-picoline as the accelerator. The propylene-maleic anhydride copolymer-epichlorohydrin mixture, which had an $A/E$ ratio of 0.5, resulted in a cross-linked film on glass cured at 80° C. which was extremely hard, having a pencil hardness of 5H. An "H" rating is about equivalent to a Barcol hardness of 80 by the 935 test. The pencil hardness test is described in Paint Testing Manual by H. A. Gardner and G. G. Sward, 12th Edition, 1962, page 131 distributed by Gardner Laboratory, Inc., Bethesda, Md. Commercial file cabinet paint has a hardness of about 2H.

A 100 percent solids coating can be used, i.e., a liquid coating, in which there are no volatiles lost during the cure, of, if the solutions are too viscous to apply properly, a volatile inert solvent referred to above can be employed to act as a carrier only. Suitable solvents include materials, such as acetone, paraffins, such as n-hexane, and aromatics, such as benzene. The preferred solvents boil between 27° and 260° C. and preferably between about 90° and 200° C. at atmospheric pressure.

*Example 98*

In this run, 2491 grams of dimethylbenzyl succinic anhydride were heated to 120° C. and 400 grams of maleic anhydride were slowly added over a five hour period along with 10 grams of benzoyl peroxide which were added slowly over a six hour period. The product was distilled and 860 grams of di[alpha-(alpha-succinic anhydride)isopropyl]benzene were recovered. Forty-eight grams of di-[alpha-succinic anhydride)isopropyl]benzene were dissolved in 19.47 grams of epichlorohydrin [A/E of 1.0] and then 2 grams of 3-picoline (3 percent by weight) were added. The mixture was cured at room temperature and a hard, rigid product was obtained having a Barcol hardness of 78.

Example 98 shows that suitable polyanhydrides can be prepared by procedures other than the polymerization and copolymerization procedures disclosed above. That is, solid di- or polyanhydrides can also suitably be prepared by reacting an unsaturated dicarboxylic acid anhydride, such as maleic anhydride, with compounds containing atoms which can be abstracted by a free radical type process. For example, compounds containing tertiary carbon atoms and those containing reactive hydrogen atoms, i.e. hydrogen atoms which can be abstracted by a free radical catalyst, can be employed. Preferred are the tertiary carbon containing compounds where at least one of the substituents on the tertiary carbon is an aryl group or a substituted aryl group and where one of the substituents is a hydrogen atom. A suitable class of these compounds would include the substituted benzyl succinic anhydrides, such as benzyl succinic anhydride, dimethylbenzyl succinic anhydride, alpha,alpha-dichlorobenzyl succinic anhydride, etc.

Other materials can be added to the compositions of this invention, such as pigments, oxidizing agents, anti-oxidizing agents, inert fillers, etc. For example, glass cloth laminates have successfully been prepared from the higher molecular weight (dilute solution viscosity of 0.24) propylene-maleic anhydride copolymer-epichlorohydrin mixture by building up alternate layers of glass cloth and resin, immediately after adding the 3-picoline accelerator, and then curing the laminates at room temperature and 80° C. for 24 hours. Hard, smooth surface products were obtained.

The compositions of this invention are curable liquid solutions at room temperature as opposed to pastes or solids. When cured, these liquids produce solid, infusible, cross-linked materials which are resistant to solution in organic solvents, such as acetone.

The compositions of this invention have excellent solvent resistance properties. For example, a liquid mixture of a hexene-1-maleic anhydride copolymer and propylene oxide was cured at room temperature using pyridine as an accelerator. A rigid solid was obtained in four hours which was substantially insoluble in acetone, benzene, carbon tetrachloride and heptane.

Resort may be had to such variations and modifications as fall within the spirit of the invention and the scope of the appended claims.

We claim:

1. A new composition capable of being thermoset to a solid infusible resin having a network of ester and ether linkages, said ester linkages being formed through the interaction of anhydride and epoxide groups and said ether linkages being formed through the interaction of epoxide groups, said composition consisting essentially of a liquid solution at room temperature of a mixture of a solid compound containing at least two succinic anhydride groups in which the carbon atoms alpha to the carbonyl groups in the succinic anhydride groups are connected to each other through a single bond and a liquid mono-oxirane compound containing as its only functional group a single oxirane oxygen atom, and having the general formula:

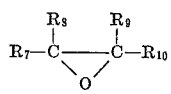

wherein $R_7$, $R_8$ and $R_9$ are selected from the group consisting of hydrogen, a saturated hydrocarbon radical; an unsaturated hydrocarbon radical; a substituted saturated hydrocarbon radical; a substituted unsaturated hydrocarbon radical; and —OR, where R is a hydrocarbon radical and $R_{10}$ is selected from the group consisting of a saturated hydrocarbon radical; an unsaturated hydrocarbon radical; a substituted saturated hydrocarbon radical; a substituted unsaturated hydrocarbon radical; and —OR, where R is a hydrocarbon radical, and wherein the unsaturation in said hydrocarbon radicals is such that the unsaturated mono-oxirane will not homopolymerize.

2. A composition according to claim 1 comprising in addition a cure accelerator comprising a tertiary amine.

3. A composition according to claim 2 wherein the tertiary amine is represented by the formula:

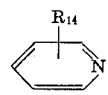

wherein $R_{14}$ is selected from the group consisting of hydrogen, a saturated hydrocarbon radical having between one and ten carbon atoms; an unsaturated hydrocarbon radical having between one and ten carbon atoms; a saturated substituted hydrocarbon radical having between one and ten carbon atoms; and an unsaturated substituted hydrocarbon radical having between one and ten carbon atoms.

4. A composition according to claim 2 wherein the tertiary amine is N,N-dimethylaniline.

5. A composition according to claim 3 wherein the tertiary amine is 3-picoline.

6. A new composition capable of being thermoset to a solid infusible resin having a network of ester and ether linkages, said ester linkages being formed through the interaction of anhydride and epoxide groups and said ether linkages being formed through the interaction of epoxide groups, said composition consisting essentially of a liquid solution at room temperature of a mixture of
   (A) a solid copolymer having at least two succinic anhydride groups produced by the copolymerization of
       (1) an unsaturated dicarboxylic acid anhydride having the general formula:

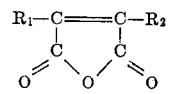

where $R_1$ is a member selected from the group consisting of hydrogen, halogen, a hydrocarbon radical, and a substituted hydrocarbon radical, and $R_2$ is selected from the group consisting of hydrogen and halogen atoms; and
       (2) an olefinic compound having the general formula:

where $R_3$ is selected from the group consisting of hydrogen, halogen, a hydrocarbon radical and a substituted hydrocarbon radical and $x_1$ and $x_2$ are selected from the group consisting of hydrogen, halogen, a hydrocarbon radical, a substituted hydrocarbon radical, and —OR, where R is a hydrocarbon radical, and
   (B) a liquid mono-oxirane compound having the general formula:

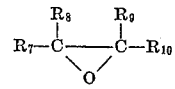

wherein $R_7$, $R_8$ and $R_9$ are selected from the group consisting of hydrogen, a saturated hydrocarbon radical; an unsaturated hydrocarbon radical; a substituted saturated hydrocarbon radical; a substituted unsaturated hydrocarbon radical; and —OR, where R is a hydrocarbon radical and R₁₀ is selected from the group consisting of a saturated hydrocarbon radical; an unsaturated hydrocarbon radical; a substituted saturated hydrocarbon radical; a substituted unsaturated hydrocarbon radical; and —OR, where R is a hydrocarbon radical, and wherein the unsaturation in said hydrocarbon radicals is such that the unsaturated mono-oxirane will not homopolymerize.

7. A composition according to claim 6 comprising in addition a cure accelerator comprising a tertiary amine.

8. A new composition capable of being thermoset to a solid infusible resin having a network of ester and ether linkages, said ester linkages being formed through the interaction of anhydride and epoxide groups and said ether linkages being formed through the interaction of epoxide groups, said composition consisting essentially of a liquid solution at room temperature of a mixture of:
(A) a solid copolymer having at least two succinic anhydride groups produced by the copolymerization of
(1) maleic anhydride, and
(2) an olefinic compound having the general formula:

where R₃ is selected from the group consisting of hydrogen, halogen, a hydrocarbon radical and a substituted hydrocarbon radical and x₁ and x₂ are selected from the group consisting of hydrogen, halogen, a hydrocarbon radical, a substituted hydrocarbon radical, and —OR, where R is a hydrocarbon radical, and
(B) a liquid mono-oxirane compound having the general formula:

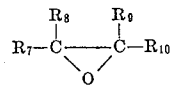

wherein R₇, R₈ and R₉ are selected from the group consisting of hydrogen, a saturated hydrocarbon radical; an unsaturated hydrocarbon radical; a substituted saturated hydrocarbon radical; a substituted unsaturated hydrocarbon radical; and —OR, where R is a hydrocarbon radical and R₁₀ is selected from the group consisting of a saturated hydrocarbon radical; an unsaturated hydrocarbon radical; a substituted saturated hydrocarbon radical; a substituted unsaturated hydrocarbon radical; and —OR, where R is a hydrocarbon radical, and wherein the unsaturation in said hydrocarbon radicals is such that the unsaturated mono-oxirane will not homopolymerize.

9. A new composition capable of being thermoset to a solid infusible resin having a network of ester and ether linkages, said ester linkages being formed through the interaction of anhydride and epoxide groups and said ether linkages being formed through the interaction of epoxide groups, said composition consisting essentially of a liquid solution at room temperature of a mixture of:
(A) a solid copolymer having at least two succinic anhydride groups produced by the copolymerization of
(1) maleic anhydride, and
(2) an aliphatic alpha monoolefin having between two and 30 carbon atoms per molecule, and
(B) a liquid mono-oxirane compound having the general formula:

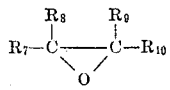

wherein R₇, R₈ and R₉ are selected from the group consisting of hydrogen, a saturated hydrocarbon radical; an unsaturated hydrocarbon radical; a substituted saturated hydrocarbon radical; a substituted unsaturated hydrocarbon radical; and —OR, where R is a hydrocarbon radical and R₁₀ is selected from the group consisting of a saturated hydrocarbon radical; an unsaturated hydrocarbon radical; a substituted saturated hydrocarbon radical; a substituted unsaturated hydrocarbon radical; and —OR, where R is a hydrocarbon radical, and wherein the unsaturation in said hydrocarbon radicals is such that the unsaturated mono-oxirane will not homopolymerize.

(C) a cure accelerator comprising a tertiary amine.

10. A composition according to claim 8 wherein the olefinic compound is styrene.

11. A composition according to claim 6 wherein the liquid mono-oxirane compound is styrene oxide.

12. A composition according to claim 7 wherein the liquid mono-oxirane is a terminal mono-oxirane compound.

13. A composition according to claim 12 wherein epichlorohydrin is the mono-oxirane compound employed.

14. A composition according to claim 9 wherein the aliphatic alpha-olefin is hexene-1.

15. A new composition having a network of ester and ether linkages, said ester linkages being formed through the interaction of anhydride and epoxide groups and said ether linkages being formed through the interaction of epoxide groups, said new composition comprising the reaction product of a mixture consisting essentially of:
(A) a solid polyanhydride containing at least two succinic anhydride groups in which the carbon atoms alpha to the carbonyl groups in the succinic anhydride groups are connected to each other through a single bond, and
(B) a liquid mono-oxirane compound having the general formula:

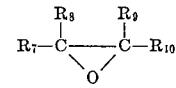

wherein R₇, R₈ and R₉ are selected from the group consisting of hydrogen, a saturated hydrocarbon radical; an unsaturated hydrocarbon radical; a substituted saturated hydrocarbon radical; a substituted unsaturated hydrocarbon radical; and —OR, where R is a hydrocarbon radical and R₁₀ is selected from the group consisting of a saturated hydrocarbon radical; an unsaturated hydrocarbon radical; a substituted saturated hydrocarbon radical; a substituted unsaturated hydrocarbon radical; and —OR, where R is a hydrocarbon radical, and wherein the unsaturation in said hydrocarbon radicals is such that the unsaturated mono-oxirane will not homopolymerize, said solid polyanhydride being substantially completely dissolved in said liquid mono-oxirane compound to form a liquid solution at about room temperature before curing is complete.

16. The cured reaction product of a composition claimed in claim 2.

17. The cured reaction product of a composition claimed in claim 6.

18. The cured reaction product of a composition claimed in claim 8.

19. The cured reaction product of a composition claimed in claim 9.

20. The cured reaction product of a composition claimed in claim 14.

21. The cured reaction product of a composition claimed in claim 14 wherein the mono-oxirane compound is epichlorohydrin and the tertiary amine is 3-picoline.

22. The cured reaction product of a composition according to claim 14 wherein the mono-oxirane compound is phenyl glycidyl ether and the tertiary amine is 3-picoline.

23. The cured reaction product of a composition according to claim 14 wherein the mono-oxirane compound is butylene oxide and the tertiary amine is 3-picoline.

24. The cured reaction product of a composition according to claim 14 wherein the monoepoxide is epichlorohydrin and the tertiary amine is N,N-demethylaniline.

References Cited
FOREIGN PATENTS 609,715  11/1960  Canada.
852,612  10/1960  Britain.

JOSEPH L. SCHOFER, *Primary Examiner.*

J. KIGHT, *Assistant Examiner.*

UNITED STATES PATENT OFFICE
CERTIFICATE OF CORRECTION

Patent No. 3,374,209                                            March 19, 1968

Russell G. Hay et al.

It is hereby certified that error appears in the above numbered patent requiring correction and that the said Letters Patent should read as corrected below.

Column 3, line 65, strike out "1-chloro-4-p-decylphenylmaleic and insert instead -- 1-chloro-2-p-decylphenylmaleic --; column 7, line 43, after "anhydride" insert -- compounds --; column 12, between lines 64 and 65, insert -- pyridine --; columns 15 and 16, Table III, first column, opposite Example 62, for "do" read -- decene-1 --; same table, last column, opposite Example 64, for "Darcol 8" read -- Barcol 8 --; same table, footnote 3, strike out "DMP-30=tri(demethylaminomethyl)phenol" and insert instead -- DMP-30=tri(dimethylaminomethyl)phenol --; column 18, line 60, for "means" read -- meant --; column 19, line 58, for "film" read -- films --.

Signed and sealed this 22nd day of July 1969.

(SEAL)
Attest:

EDWARD M. FLETCHER, JR.                          WILLIAM E. SCHUYLER, JR.
Attesting Officer                                          Commissioner of Patents